Jan. 9, 1951 F. J. TIPPEN 2,537,559
FRICTION DISK DRIVE WITH PRESSURE
DISTRIBUTING IDLERS
Filed April 30, 1945 3 Sheets-Sheet 1
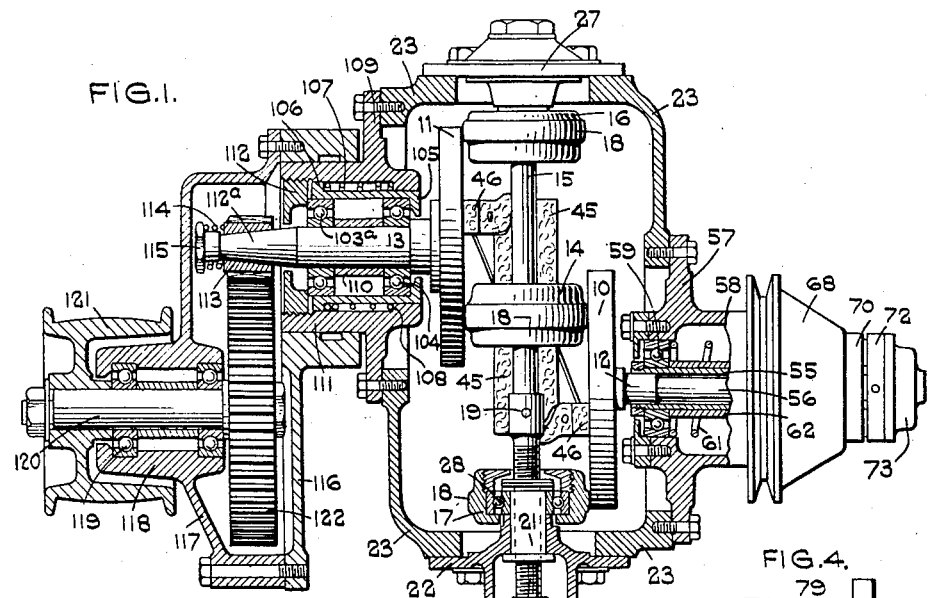
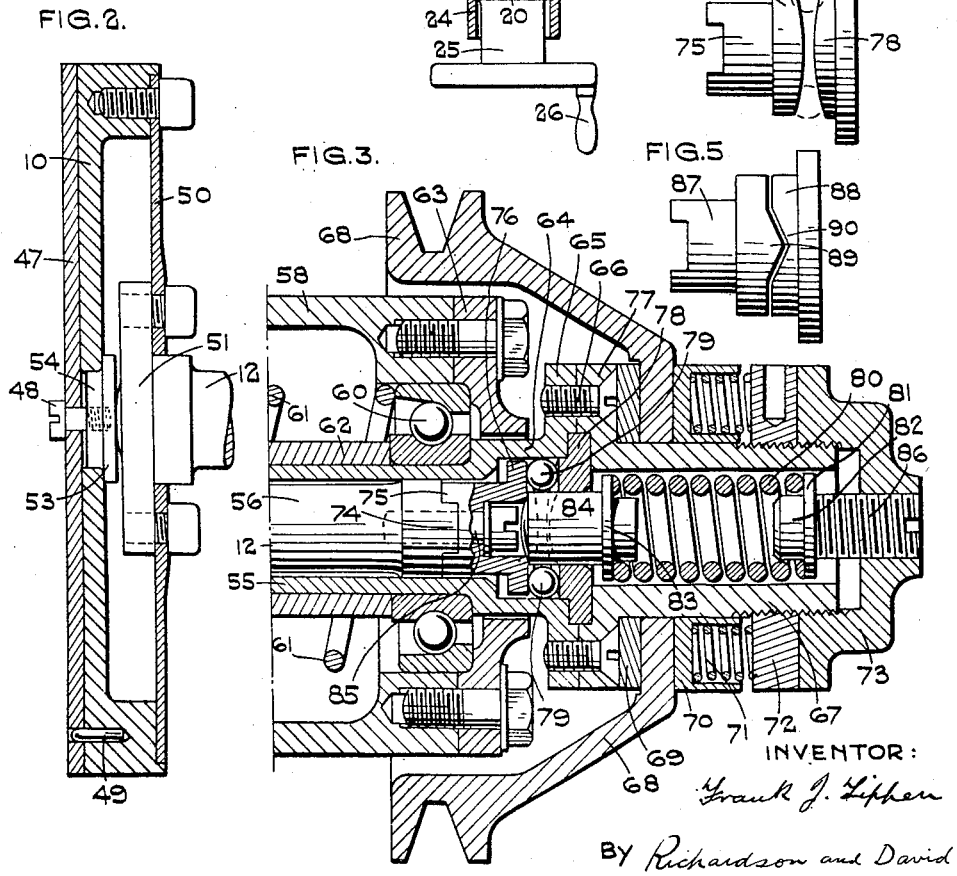
INVENTOR:
Frank J. Tippen
BY Richardson and David
ATTORNEYS

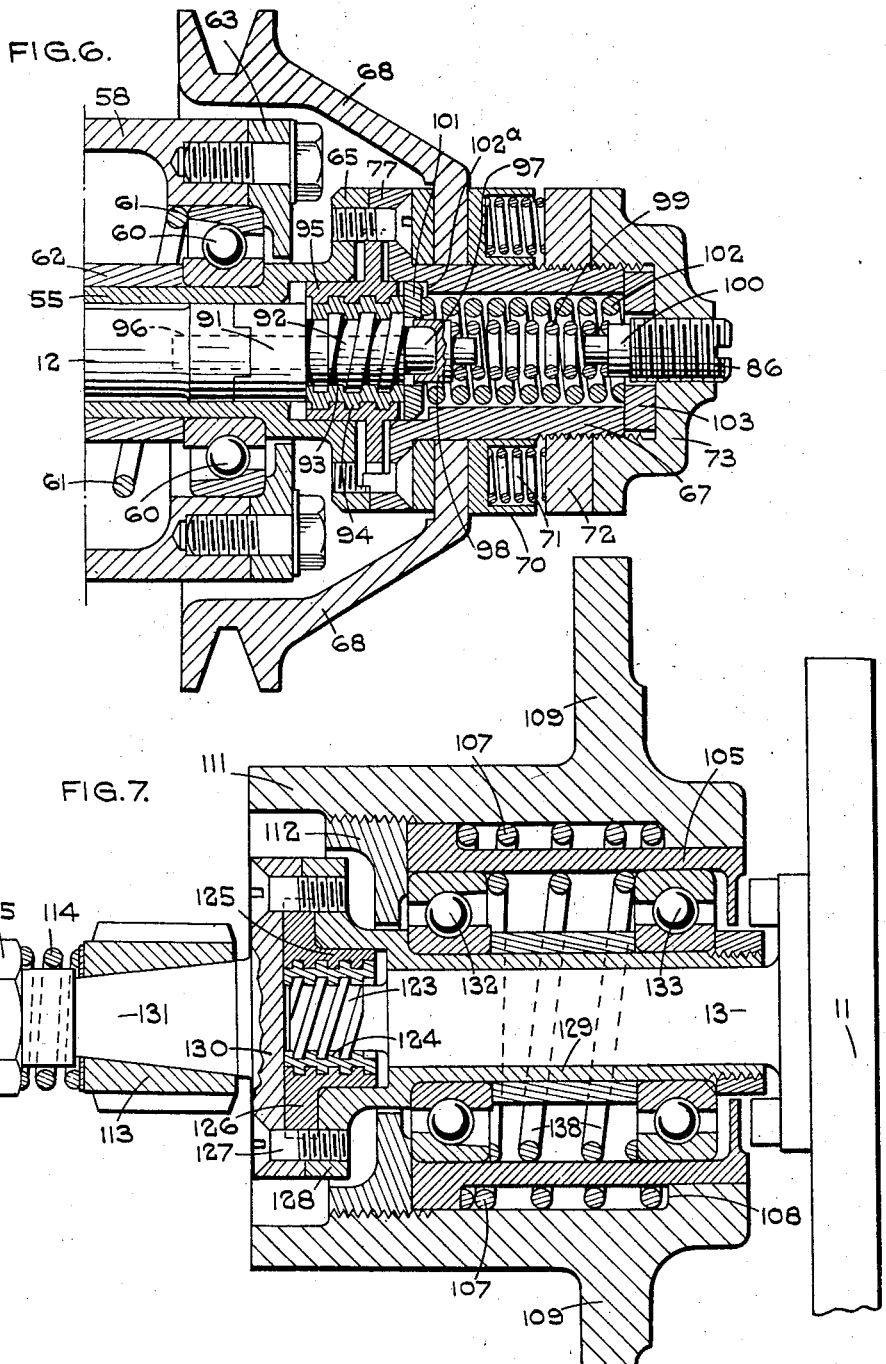

Jan. 9, 1951   F. J. TIPPEN   2,537,559
FRICTION DISK DRIVE WITH PRESSURE
DISTRIBUTING IDLERS
Filed April 30, 1945   3 Sheets-Sheet 3
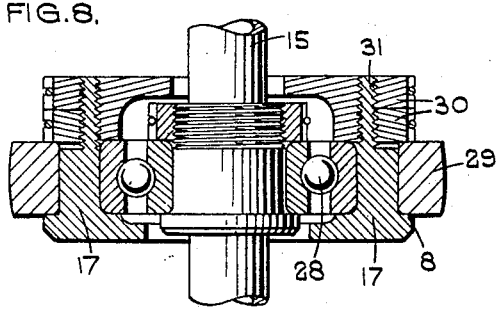
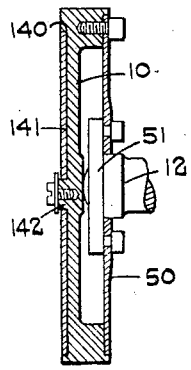
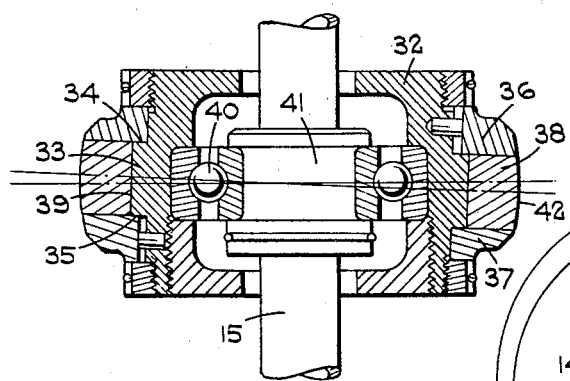
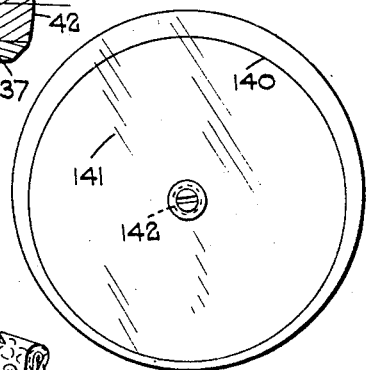
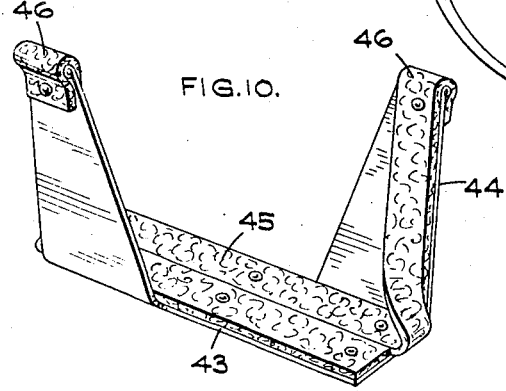
INVENTOR:
Frank J. Tippen
BY Richardson and David
ATTORNEYS Patented Jan. 9, 1951

2,537,559

UNITED STATES PATENT OFFICE 2,537,559

FRICTION DISK DRIVE WITH PRESSURE DISTRIBUTING IDLERS

Frank John Tippen, Coventry, England

Application April 30, 1945, Serial No. 591,083
In Great Britain May 5, 1944

11 Claims. (Cl. 74—200)

This invention relates to a variable speed gear of the kind which includes driving and driven discs mounted on parallel out of line shafts and frictionally coupled together by a transverse transmitting friction disc mounted for movement parallel to the faces of the driving and driven friction discs.

In gear of this kind if the contacting surface of the transverse transmission disc is a cylinder, relative rubbing motion will take place between parts of this cylindrical surface and the faces of the driving and driven discs, such relative motion causing wear by friction. One of the objects of the present invention is to construct a gear so that an efficient drive is maintained with a contact of minimum area between the surface of the transverse transmitting friction disc and the driving and driven disc so that such rubbing action is avoided or reduced to a minimum. Owing to the deflection of the materials under pressure contact occurs over small areas of the engaging discs but hereinafter these areas will be referred to as points of contact.

With such an arrangement the working surface of the transmitting friction disc is theoretically a line extending around the periphery, and a further object of the present invention is to provide a construction wherein the points of contact are dispersed across an appreciable width of the periphery of the transmitting friction disc instead of lying always on the same circumferential line.

A further object of the invention is to construct the transmitting friction disc so that any wear that takes place on its periphery instead of forming a flat thereon will maintain the part spherical characteristic of the surface.

A further object of the invention is to construct and mount the working faces of the driving and driven discs in such a manner that the points of contact with the periphery of the transmitting friction disc instead of lying always on the same circular line, will be dispersed over an appreciable area of the working face.

In gear of the kind referred to if slip occurs between the transmitting friction disc and either the driving or driven discs, damage is done to the working surfaces of the parts and it is a further object of the present invention to provide a construction wherein the possibility of such slip is greatly reduced or entirely eliminated.

A further object of the present invention is to construct the gear so that the pressures obtained between the driving and driven discs and transmission disc throuh a considerable range of speed approximate closely to the pressures theoretically required with a given co-efficient of friction for the materials used.

A further object of the present invention is to provide means to prevent the gear from being overloaded.

A further object of the present invention is to provide means whereby the necessary working pressure is obtained between the points of contact of the driving disc and the transmitting disc and between the transmitting disc and the driven disc.

A further object of the present invention is to provide means for lubricating the contacting surfaces of the driving disc and transmission disc and of the contacting faces of the transmission disc and the driven disc.

Other objects of my invention will become apparent from the following description.

Referring to the drawings—

Figure 1 is a sectional plan view showing one construction of gear in accordance with the present invention.

Figure 2 is a sectional view upon an enlarged scale showing the construction of the driving friction disc.

Figure 3 is a sectional plan view upon an enlarged scale showing one method of applying the drive to the driving shaft.

Figure 4 is a plan view showing a part of the driving mechanism.

Figure 5 is a plan view showing an alternative form of driving mechanism.

Figure 6 is a sectional plan view showing another form of driving mechanism.

Figure 7 is a sectional plan view showing the driven disc and its shaft and associated parts.

Figure 8 is a sectional plan view showing a construction of balancing disc.

Figure 9 is a sectional view showing the preferred construction of friction transmitting disc.

Figure 10 is a perspective view of the lubricating means.

Figure 11 is a sectional view in side elevation showing an alternative construction of driving or driven disc 10 or 11.

Figure 12 is a side view thereof.

In the construction shown in Figures 1 to 4 the driving disc is shown at 10 and the driven disc at 11. The disc 10 is mounted upon a shaft 12 and the disc 11 is mounted on a shaft 13, the shafts 12 and 13 being parallel to each other but being out of line.

The discs 10 and 11 are coupled together frictionally by a friction transmitting disc 14 mounted on a shaft 15 which is parallel to the faces of the discs 10 and 11.

The shaft 15 is made of a material and to a diameter which ensures that it is slightly flexible so that axial pressure from the disc 10 can be transmitted by the friction transmitting disc 14 to the driven disc 11.

Two balancing discs 16 and 17 are provided, the disc 16 engaging the driven disc 11 on the opposite side of the centre thereof from that where the transmitting disc 14 engages, and the disc 17 engages the face of the disc 19 on the opposite side of the centre thereof from that where the friction transmitting disc 14 engages.

The three discs 14, 16 and 17 each have peripheral surfaces which engage the discs 10 and 11 and these peripheral surfaces 18 are of part spherical form so that theoretically in the sense hereinbefore referred to, the contact between each of these three discs and the faces of the discs 10 and 11 is a point contact.

The two discs 16 and 17 may be constructed as shown in Figure 1 or as shown in Figure 8.

The shaft 15 is made in two parts secured together by a coupling 19 and one part is screw threaded as shown at 20. This screw threaded part of the shaft engages in a sleeve 21 which is screw threaded internally. The sleeve 21 is mounted in a cap 22 attached to the casing 23 and the cap 22 has a cylindrical portion 24, the interior surface of which forms a guide for a rotary member 25 fixed to the shaft, the rotary member 25 having a handle 26 whereby the shaft can be rotated to produce axial movement of the disc 14.

At the opposite end the shaft 15 can slide through a sleeve which is similar to the sleeve 21 but is not threaded. This sleeve is not shown in the drawing but is mounted within a cap 27 secured to the casing 23.

Mounted on the sleeve 21 is a ball bearing 28 and the disc 17 is mounted on this ball bearing. The ball bearing is retained in position on the sleeve 21 by any suitable means.

The disc 16 is mounted similarly on a bearing fixed on the projecting end of the sleeve which is mounted within the cap 27, and the whole arrangement is such that when the handle 26 is turned, the shaft 15 is moved axially but the discs 16 and 17 are not moved axially but can of course rotate freely.

The discs 16 and 17 may both be constructed as shown at 17 in Figure 1, the construction being such that the driving surface 18 is integral with the body.

Alternatively these two discs may be constructed as shown in Figure 8 wherein the body 17 is provided with a ball bearing 28 and carries a replaceable tyre 29 retained in position by nuts 30 screwing on to a threaded part 31 of the body 17.

The transmitting disc 14 may also be constructed with its driving surface 18 intgeral with the body. It is however preferred to use the construction shown in Figure 9 wherein the body 32 is provided with a peripheral flange 33 opposite sides 34 and 35 of which are obliquely disposed in relation to a plane which is at right angles to the axis of the body 32.

Rings 36 and 37 are detachably secured against the shoulders 34 and 35, the opposed surfaces of these rings being in line with the shoulders 34 and 35 and between the rings is mounted a renewable tyre 38, this tyre bearing on a cylindrical surface 39 on the body, the axis of which is inclined to the axis of the body.

The body is mounted on a ball bearing 40 mounted on a flanged collar 41 fixed to the shaft 15 so that endwise movement of the shaft 15 is transmitted to the disc 14. The tyre 38 can creep circumferentially on the body as the disc rotates with the result that the points of contact between the tyre and the two discs 10 and 11 become spread over an appreciable width of the part spherical engaging surface 42, thus distributing the wear over a considerable area instead of it being confined to a circumferential line. Further with this arrangement the periphery of the tyre 38 will not tend to wear flat. The part spherical shape of the surface 42 will continue to be retained even if wear takes place.

The surfaces of the discs 10 and 11 may be lubricated by the lubricator shown in Figure 10, this lubricator comprising a bracket 43 having upwardly projecting arms 44 to which are secured absorbent wick members 45, the ends 46 of which are in light pressure contact with the surfaces of the discs 10 and 11.

This lubricating element is placed in the base of the casing 23 and may if desired be fixed thereto and a suitable quantity of paraffin or other lubricant is placed in the casing 23.

The discs 10 and 11 may both be provided with renewable wearing faces formed by plates 47 shown in Figure 2, the plates 47 being attached each by a screw 48 engaging a plate 54 at the back of the disc and the plates 47 being prevented, if desired, from rotating relatively to the discs 10 and 11 by a dowel 49.

Instead of using the construction shown in Figure 2 either the disc 10 or 11, or both, may be constructed as shown in Figures 11 and 12 wherein the face of the disc 10 is provided with a circular recess 140 which is eccentric in relation to the periphery of the disc and mounted in this eccentric recess is a face plate 141. This face plate is mounted on a boss 142 which is concentric with the recess 140 but eccentric in relation to the periphery of the disc.

The face plate 141 is retained against the bottom of the recess by a screw and washer as shown.

With this arrangement the face plate 141 is able to creep around the center of the boss 142 during the working of the gear with the result that the points of contact between the friction transmitting disc 14 and the plates 141 will not all lie upon a circular line but will become dispersed over an appreciable area of the plate 141.

Further the disc 10 is of hollow construction at the back and is provided with a somewhat resilient plate 50 by which the disc is secured by a flange 51 on the driving shaft 12. The end of the driving shaft which may be of part spherical form may engage a flange 43 on the plate 54 engaging the body of the disc 10.

It will be appreciated that a certain pressure is necessary in an axial direction on the disc 10 in order that it may drive the disc 14, and this pressure is mainly transmitted to the disc 10 by the driving shaft 12 through the plate 54. The plate 50 provides for a slight resilience in the structure of the driving disc which is loaded axially at the centre in one direction and in the opposite direction at two offset positions where it engages the discs 14 and 17. The pressure required to transmit a given torque varies inversely in accordance with the distance between the centre of the disc 10 and its point of contact with the disc 14 and these conditions are substantially met by the manner of loading and supporting the disc 10.

The driving shaft 12 extends through a sleeve 55 which is adapted to be driven together with the shaft. For a portion of its length 56 the shaft 12 is of reduced diameter whereby it is permitted to make slight bending movements during its operation.

Thus the desired resilience of the structure of the driving element may be provided by the plate 50 or by the reduced section of the part 56 or both may contribute to it. This resilience permits the pressure of the driving disc 10 on the transmitting disc 14 to be an inverse function of distance between the point of contact between them and the centre of the driving disc bearing in mind that the balancing disc 17 is at a constant distance from the centre of the driving disc. This makes an important contribution towards maintaining the torque transmitting capacity of the gear as the transmitting disc approaches the centre of the driving disc.

The provision of the resilient plate 50 and the reduced portion 56 of the driving shaft 12 are shown as applied to the driving disc 10. Similar provision may be made to the driven disc 11 and the shaft 13.

The shaft 12 extends through an opening in one end of the casing, which opening is closed by a cap 57 having a tubular extension 58 carrying a pair of spaced ball bearings 59, 60 in which the sleeve 55 is mounted.

The ball bearing 60 is retained in position by a plate 63 secured to the end of the tubular part 58 of the cap 57.

The end of the sleeve 55 has an enlarged portion 64 and a flange 65 and this flange 65 is secured by screws 66 to a hollow shaft 67 upon which is mounted a driving pulley 68. The inner part of this driving pulley is mounted between a ring 69 and a second ring 70 acted upon by compression springs 71 which abut against an adjustable ring 72 so that the pressure of the springs 71 can be adjusted.

The ring 72 is locked in position by an end cap 73 screwing on to the hollow shaft 67.

The arrangement is such that the torque imparted to the pulley 68 is frictionally transmitted to the unit formed by the hollow shaft 67 and the sleeve 55. The pressure of the springs 71 can be adjusted so that the torque which can be applied to the rotating unit which includes the shaft 12, can be kept down to a predetermined limit.

The end of the shaft 12 is provided with a driving dog 74 which engages in a slot in the end of a sleeve 75 having a flange 76. The end face of this flange is formed as a cam having two spaced concavities.

Mounted between the flange 65 on the end of the sleeve 55 and a flange 77 on the end of the hollow shaft 67 is a second cam member 78 having its end face formed with two spaced concavities. Two balls 79 are placed between the two pairs of concavities in the members 76 and 78 with the result that when the member 78 is rotated with the unit 67, 55, rotary motion is imparted to the shaft 12 accompanied by an axial thrust produced by the cam surfaces acting through the balls 79, which axial thrust is proportional or approximately proportional to the torque. In this way the disc 10 has applied to it an axial thrust against the disc 14.

An initial axial load on the shaft 12 is produced by a spring 80 acting between a flange 81 on an adjustable pin 82, and a flange 83 on a pin 84 bearing on the end of the sleeve 75 which is secured to the end of the shaft 12 by means of the screw 85.

The pin 82 has a screw threaded portion 86 engaging in a tapped hole in the cap 73 in order that the pressure of the spring 80 may be adjusted.

An alternative method of imparting the drive to the shaft 12 accompanied by an end thrust which is proportional or approximately proportional to the torque is to replace the members 75 and 78 shown in Figure 4 by the members 87 and 88 shown in Figure 5. The member 87 is provided with two V-shaped projections 89 which engage in V-shaped recesses 90 in the member 88, these projections and recesses forming cam surfaces which produce the endwise thrust.

A further alternative is shown in Figure 6 wherein the sleeve 75 is replaced by a pin 91 having a screw threaded portion 92 engaging in a sleeve 93 having a thread on its interior and another thread 94 of opposite hand on its exterior. This thread 94 engages an interior thread in an outer sleeve 95 secured between the flange 65 of the sleeve 55 and the flange 77 on the hollow driving shaft 67.

This device consisting of the outer sleeve 95, an intermediate sleeve 93 and the threaded part 92 of the pin 91 is designed to impart to the shaft 12 an endwise thrust which is proportional or approximately proportional to the torque for either direction of rotation of the pulley 68.

It should be noted that the devices shown in Figures 4 and 5 also impart an endwise thrust on the shaft 12 in the same direction for either direction of rotation of the pulley 68.

The end of the intermediate threaded member 93 is engaged by a washer 101 upon which acts a compression spring 102, the opposite end of which engages a washer 103 placed between the end of the driving shaft 67 and the cap 73. The washer 101 is thus spring loaded in the direction towards the disc 10.

In operation when the pulley 68 is driven in one direction relative rotary motion takes place between the members 95 and 93 so that the latter moves in an endwise direction until the washer 101 engages the shoulder 102a in the hollow shaft 67 and thereafter the members 95 and 93 rotate together and impart an endwise thrust in the required direction to the pin 91. The spring 102 is then dormant.

The pin 91 is attached to the end of the shaft 12 by means of a screw 96 and the head 97 of the screw is engaged by a cap 98 on which acts a second compression spring 99 providing an additional endwise load on the shaft 12. The spring 99 abuts against a screwed pin 100 screwing into the cap 73 so that the pressure of the spring can be adjusted. This spring pressure continues to act under all conditions.

When the pulley 68 is driven in the opposite direction it tends to move the intermediate sleeve 93 to the left as shown in Figure 6 so that an endwise force is applied thereby to the pin 91.

With any of these arrangements an endwise thrust to the left as shown in Figures 1 and 3 is produced on the shaft 12 and a corresponding reaction is set up as an axial thrust to the right in the sleeve 55. This axial thrust is transmitted to the inner race of the bearing 59.

Acting between the outer races of the two ball bearings 59, 60 is a compression spring 61 so that the axial thrust applied to the bearing 59 by the sleeve 55 is transmitted to the other bearing. Further, a distance tube 62 is placed between the inner races of the two ball bearings, this distance tube being mounted on the sleeve 55.

Referring to Figure 1 the driven shaft 13 is supported in ball bearings 103a and 104 carried in the sleeve 105 having a flange 106 upon which acts a compression spring 107 engaging a shoulder 108 in a cap 109 secured in an opening in the casing 23. A distance tube 110 is placed on the shaft 13 between the bearings 103a and 104. The spring 107 forms in effect a distance piece of variable length for facilitating the endwise adjustment of the disc 11 together with its shaft and bearings. Similar provision may if desired be made for the disc 10 and its shaft 12 and bearings.

The cap 109 is provided with a tubular part 111 in which the sleeve 105 is mounted and a screwed ring 112 engages in the tubular part 111 and locates the bearings.

The shaft 13 is provided with a tapered portion 112a on which is mounted a driven pinion 113, the pinion being spring loaded by a spring 114 on to the tapered part of the shaft. The pressure of the spring 114 can be adjusted by turning a nut 115 screwing on to a reduced part on the end of the shaft 112a. In this way the value of the torque which can be transmitted can be limited to a predetermined figure.

Mounted on the tubular part 111 of the cap 109 is a bracket 116 to which is attached a casing member 117 having a tubular part 118 carrying bearings 119 in which is mounted a driven shaft 120 carrying a pulley 121 by which power may be taken off.

The shaft 120 carries a gear wheel 122 gearing with the pinion 113.

An alternative arrangement is shown in Figure 7 wherein the driven shaft 13 is provided with a reduced extension 123 which is screw threaded, the thread being engaged by a threaded sleeve 124. The sleeve 124 has an exterior thread which engages a thread in the sleeve 125. This sleeve 125 is provided with a flange 126 which is secured by screws 127 between a flange 128 on a sleeve 129 mounted on the shaft 13 and a flange 130 formed on a tapered shaft 131.

The screw threads on the shaft part 123 and in the sleeve 125 are of opposite hand and the device has the same object as that described with reference to Figure 6, i. e. for either direction of rotation of the driven disc 11 an endwise reaction is produced on the shaft 13 towards the disc 14.

The sleeve 129 is supported in the bearings 132 and 133 mounted in the sleeve 105 and the sleeve 105 is spring loaded by the spring 107 while a further spring 138 operates between the two outer races of the ball bearings. The purpose of the spring 138 is to ensure that the axial thrust on the sleeve is shared by the outer races of the two bearings 132 and 133.

In operation when the disc 11 is driven in one direction an endwise thrust to the right as shown in Figure 7 is produced by the engagement of the threaded part 123 of the shaft 13 with the intermediate sleeve 124. When the disc 11 is driven in the opposite direction an endwise thrust on the shaft 13 to the right as shown in Figure 7 is produced by the action of the external thread on the intermediate sleeve 124 with the thread in the member 125 which is fixed to the sleeve 129.

The arrangements described and shown for producing an endwise thrust in the shaft 12 proportional to the torque applied to the shaft may be duplicated for the driven shaft 13, the endwise thrust in the latter case being towards the transmission disc 14.

What I claim then is:

1. Variable speed gear of the kind specified comprising a driving disc of resilient construction, a friction transmission disc engaging the face of said driving disc, means for loading said driving disc in an axial direction, and a balancing disc engaging the driving surface of the driving disc on the opposite side of its centre of rotation from that at which the friction transmission disc engages, and at a fixed distance from the axis of the driving disc, whereby the axial load on said driving disc is distributed between the friction transmission disc and said balancing disc.

2. Variable speed gear of the kind specified comprising a driving disc mounted resiliently, means for loading said driving disc in an axial direction, a friction transmission disc engaging the face of said driving disc and a balancing disc engaging the driving surface of the driving disc on the opposite side of its centre of rotation from that at which the friction transmission disc engages, and at a fixed distance from the axis of the driving disc, whereby the axial load on said driving disc is distributed between the friction transmission disc and said balancing disc.

3. Variable speed gear of the kind specified comprising a driving disc, a driven disc of resilient construction, means for loading the driving disc in an axial direction a friction transmission disc engaging the faces of said driving and driven discs, and a balancing disc engaging the driven disc on the opposite side of its centre of rotation from that at which the friction transmission disc engages, and at a fixed distance from the axis of the driving disc, whereby the axial load on said driven disc is distributed between the friction transmission disc and said balancing disc.

4. Variable speed gear of the kind specified comprising a driving disc, a driven disc mounted resiliently, means for loading the driving disc in an axial direction a friction transmission disc engaging the faces of said driving and driven discs, and a balancing disc engaging the driven disc on the opposite side of its centre of rotation from that at which the friction transmission disc engages, and at a fixed distance from the axis of the driving disc, whereby the axial load on said driven disc is distributed between the friction transmission disc and said balancing disc.

5. Variable speed gear of the kind specified comprising a driving disc of resilient construction, a friction transmission disc engaging the face of said driving disc, said disc having a hollow back across which is secured a resilient plate, to the centre of which is a flange to which a shaft is secured, means for loading said driving disc in an axial direction, said load being transmitted to the disc partially by said resilient plate at its periphery and partly by said flange at the centre, and a balancing disc engaging the driving surface of the driving disc on the opposite side of its centre of rotation from that at which the friction transmission disc engages, and at a fixed distance from the axis of the driving disc, whereby the axial load on said driving disc is distributed between the friction transmission disc and said balancing disc.

6. Variable speed gear of the kind specified comprising a driven disc of resilient construction, said disc having a hollow back across which is secured a resilient plate, to the centre of which is a flange to which a shaft is secured, means for loading said driven disc in an axial direction, said load being transmitted to the disc partially by said resilient plate at its periphery and partly by said flange at the centre a friction transmission disc engaging the face of said driving disc and a balancing disc engaging the driven disc on the opposite side of its centre of rotation from that at which the friction transmission disc engages, and at a fixed distance from the axis of the driving disc, whereby the axial load on said driven disc is distributed between the friction transmission disc and said balancing disc.

7. Variable speed gear of the kind specified comprising a casing, bearings supported in opposite sides of said casing, said bearings being parallel but out of alignment, a driving shaft in one bearing, a driven shaft in the other bearing, a driving disc on the driving shaft and within the casing, a driven disc on the driven shaft and within the casing, a transverse shaft within the casing extending between and parallel to the faces of the driving and driven discs, a friction transmission disc mounted for rotation on said transverse shaft and engaged on opposite sides by the driving and driven disc, means for preventing endwise movement of the friction transmission disc on the transverse shaft, means for adjusting the transverse shaft in an endwise direction, sleeves in opposite sides of the casing and concentric with the transverse shaft, and balancing discs mounted for rotation on said sleeves, one of these discs engaging the driving disc and the other engaging the driven disc, said balancing discs engaging respectively the driving and driven discs at positions on the opposite sides of the centres of their rotation from that at which the friction transmission disc engages them.

8. Variable speed gear of the kind specified comprising a casing, bearings supported in opposite sides of said casing, said bearings being parallel but out of alignment, a driving shaft in one bearing, a driven shaft in the other bearing, a driving disc on the driving shaft and within the casing, a driven disc on the driven shaft and within the casing, a transverse shaft within the casing extending between and parallel to the faces of the driving and driven discs, a friction transmission disc mounted for rotation on said transverse shaft and engaged on opposite sides by the driving and driven discs, means to prevent relative movement between the friction transmission disc and the transverse shaft parallel to the axis of the said shaft, means for adjusting the transverse shaft in an endwise direction, balancing discs mounted for rotation each on an axis disposed at right angles to the faces of the driving and driven discs and supporting means on the casing for the balancing discs, said balancing discs engaging respectively the driving and driven discs at positions on the opposite sides of the centres of their rotation from that at which the friction transmission disc engages them.

9. Variable speed gear of the kind specified comprising a casing, bearings supported in opposite sides of said casing, said bearings being parallel but out of alignment, a driving shaft in one bearing, a driven shaft in the other bearing, a driving disc on the driving shaft and within the casing, a driven disc on the driven shaft and within the casing, a transverse shaft within the casing extending between and parallel to the faces of the driving and driven discs, a friction transmission disc mounted for rotation on said transverse shaft and engaged on opposite sides by the driving and driven discs, means to prevent relative movement between the friction transmission disc and the transverse shaft parallel to the axis of the said shaft, means for adjusting the transverse shaft in an endwise direction, balancing discs mounted for rotation each on an axis disposed at right angles to the faces of the driving and driven discs, supporting means on the casing for the balancing discs, and means for preventing said balancing discs from moving parallel to the faces of the driving and driven discs, said balancing discs engaging respectively the driving and driven discs at positions on the opposite sides of the centres of their rotation from that at which the friction transmission disc engages them.

10. Variable speed gear of the kind specified comprising driving and driven discs mounted on parallel out of line shafts, said discs being frictionally coupled together by a transmission friction disc mounted on a shaft which is parallel to the faces of the driving and driven discs and disposed between them, said transmission disc being movable parallel to said faces, a driving disc of resilient construction, means for loading said driving disc in an axial direction, balancing discs mounted coaxially with the shaft which carries the transmission friction disc, one of said balancing discs engaging the driving disc, and the other of said balancing discs engaging the driven disc and means for preventing said balancing discs from moving parallel to the faces of the driving and driven discs.

11. Power-transmission mechanism comprising a pair of discs mounted upon shafts which are arranged transversely to each other, one disc having a circular recess in its working face, which recess is eccentric in relation to the axis of the shaft upon which the disc is mounted, a boss on the disc at the centre of the recess, a circular plate mounted for rotation on said boss in said recess, and means for retaining said plate in the recess, and the other disc comprising a hollow body, a bearing in the body for engaging means rotating with the shaft supporting the disc, said body having an exterior bearing surface, the axis of which intersects the axis of the bearing in the body and is inclined thereto at a small angle, a tire mounted on said exterior bearing surface and capable of rotating relatively to the body, said tire having a periphery of part-spherical form, the radius of which is equal to the radius of said periphery, and means for preventing said tire from moving axially on the body, the periphery of said tire engaging the circular plate of the other disc.

FRANK JOHN TIPPEN.

REFERENCES CITED

The following references are of record in the file of this patent:

UNITED STATES PATENTS

| Number | Name | Date |
|---|---|---|
| 659,427 | Worth | Oct. 9, 1900 |
| 729,289 | De Loach | May 26, 1903 |
| 863,434 | Pattison et al. | Aug. 13, 1907 |
| 1,401,505 | Sykora | Dec. 27, 1921 |
| 1,448,189 | Brunner | Mar. 13, 1923 |
| 1,464,471 | Getz | Aug. 7, 1923 |
| 1,665,902 | Bastian | Apr. 10, 1928 |
| 1,683,715 | Erban | Sept. 11, 1928 |
| 1,827,891 | Jones | Oct. 20, 1931 |
| 2,109,845 | Madle | Mar. 1, 1938 |
| 2,220,751 | Bergman | Nov. 5, 1940 |
| 2,346,432 | Heintz | Apr. 11, 1944 |

FOREIGN PATENTS

| Number | Country | Date |
|---|---|---|
| 57,608 | Switzerland | Nov. 6, 1911 |
| 576,485 | Germany | Apr. 27, 1933 |